United States Patent
Feigenbutz

(10) Patent No.: US 11,816,567 B2
(45) Date of Patent: Nov. 14, 2023

(54) SYSTEM FOR IDENTIFYING OBJECTS BY MEANS OF DISTRIBUTED NEURAL NETWORKS

(71) Applicant: Rockwell Collins Deutschland GmbH, Heidelberg (DE)

(72) Inventor: Michael Feigenbutz, Leimen (DE)

(73) Assignee: Rockwell Collins Deutschland GmbH, Heidelberg (DE)

( * ) Notice: Subject to any disclaimer, the term of this patent is extended or adjusted under 35 U.S.C. 154(b) by 653 days.

(21) Appl. No.: 16/981,466

(22) PCT Filed: Mar. 14, 2019

(86) PCT No.: PCT/EP2019/056418
§ 371 (c)(1),
(2) Date: Sep. 16, 2020

(87) PCT Pub. No.: WO2019/175309
PCT Pub. Date: Sep. 19, 2019

(65) Prior Publication Data
US 2021/0027059 A1   Jan. 28, 2021

(30) Foreign Application Priority Data

Mar. 16, 2018 (DE) .......................... 102018106222.2
May 4, 2018 (DE) .......................... 102018110828.1

(51) Int. Cl.
*G06V 10/82* (2022.01)
*G06N 3/08* (2023.01)
(Continued)

(52) U.S. Cl.
CPC ............... *G06N 3/08* (2013.01); *G06N 3/045* (2023.01); *G06V 10/82* (2022.01); *G06V 10/95* (2022.01);
(Continued)

(58) Field of Classification Search
CPC .......... G06N 3/08; G06N 3/045; G06V 10/82; G06V 10/95; G06V 20/10; H04L 67/04; H04L 67/10; B64C 19/00; B64U 2101/30
(Continued)

(56) References Cited

U.S. PATENT DOCUMENTS

| | | | |
|---|---|---|---|
| 2017/0076195 A1* | 3/2017 | Yang | G06N 3/045 |
| 2019/0154872 A1* | 5/2019 | Leduc | H04N 23/90 |
| 2022/0269910 A1* | 8/2022 | Onzon | G06N 3/084 |

FOREIGN PATENT DOCUMENTS

| | | |
|---|---|---|
| CN | 103632143 A | 3/2014 |
| CN | 104077613 A | 10/2014 |

(Continued)

OTHER PUBLICATIONS

Teerapittayanon, Surat, et al., "Distributed Deep Neural Networks over the Cloud, the Edge and End Devices", 2017 IEEE 37th International Conference on Distributed Computing Systems, 2017, 328-339.

*Primary Examiner* — Huy C Ho
(74) *Attorney, Agent, or Firm* — Murphy, Bilak & Homiller, PLLC

(57) ABSTRACT

In a system for identifying objects by means of distributed neural networks a resource-intensive proportion of the neural network is provided at a base station (on the ground), whereas a less resource-intensive proportion of the neural network, in particular the remaining proportion of the neural network, is provided at a front end (for example remote-controlled vehicle). The technical complexity for the front-end side and for the transmission of data between the base station and front end can thus be reduced.

5 Claims, 6 Drawing Sheets

(51) Int. Cl.
  *H04L 67/04* (2022.01)
  *H04L 67/10* (2022.01)
  *G06V 20/10* (2022.01)
  *G06N 3/045* (2023.01)
  *G06V 10/94* (2022.01)
  *B64C 19/00* (2006.01)
  *B64U 101/30* (2023.01)

(52) U.S. Cl.
  CPC .............. *G06V 20/10* (2022.01); *H04L 67/04* (2013.01); *H04L 67/10* (2013.01); *B64C 19/00* (2013.01); *B64U 2101/30* (2023.01)

(58) Field of Classification Search
  USPC ......................................................... 382/103
  See application file for complete search history.

(56) References Cited

FOREIGN PATENT DOCUMENTS

| | | |
|---|---|---|
| CN | 107003989 A | 8/2017 |
| CN | 107135237 A | 9/2017 |
| CN | 107368832 A | 11/2017 |
| CN | 107368857 A | 11/2017 |
| CN | 107368886 A | 11/2017 |
| JP | 2009505288 A | 2/2009 |
| WO | 2017095948 A1 | 6/2017 |
| WO | 2017200622 A2 | 11/2017 |

\* cited by examiner

| | H | H | D | D | S | P | F# | Act.Size | Param. |
|---|---|---|---|---|---|---|---|---|---|
| Input | 32 | 32 | 3 | | | | | 3072 | 0 |
| Convolution 1 (C1) | | | | 5 | 1 | 0 | 6 | | 156 |
| Result | 28 | 28 | 6 | | | | | 4704 | 0 |
| Pooling (S2) | | | | 2 | 2 | 0 | | | 0 |
| Result | 14 | 14 | 6 | | | | | 1176 | 0 |
| Convolution 1 (C3) | | | | 5 | 1 | 0 | 16 | | 416 |
| Result | 10 | 10 | 16 | | | | | 1600 | 0 |
| Pooling (S4) | | | | 2 | 2 | 0 | | | 0 |
| Result | 5 | 5 | 16 | | | | | 400 | 0 |
| FC3 (C5) | 1 | | 120 | | | | | 120 | 48001 |
| F6 | 1 | | 84 | | | | | 84 | 10081 |
| Softmax | 1 | | 10 | | | | | 10 | 841 |

Fig. 3

SYSTEM FOR IDENTIFYING OBJECTS BY MEANS OF DISTRIBUTED NEURAL NETWORKS

The invention pertains to a system for identifying objects by means of distributed neural networks.

Basically, the structure of a classic convolutional neural network (CNN) consists of one or more convolutional layers followed by a pooling layer. This unit can principally be repeated any number of times; in the case of sufficiently numerous repetitions, one then speaks of deep convolutional neural networks that fall within the scope of deep learning.

Convolutional neural networks for real-time object identification in high-resolution videos require an adequate computer performance, memory space and support through specific complex graphics modules. The aforementioned computer resources usually have enormous power and space requirements and are correspondingly heavy.

The requirements for size, weight and power requirement cannot be met on small and medium-sized remote-controlled vehicles (in this case, in particular, unmanned aerial vehicles).

Another problem is the cost of such solutions on the vehicle. This applies, in the case of small and medium-sized vehicles, to both the unit costs and to the costs of future enhancements.

In addition, such networks must be trained via examples and cannot continue learning independently after the learning phase (without feedback).

The invention is based on the object of providing real-time object identification by means of neural network technology for remote-controlled vehicles with limited computer resources and limited link bandwidth. Thus, an enhancement of real-time object identification by means of neural network technology by means of distributed networks is to be achieved. In addition, under certain circumstances, continuous automatic further training of neural networks already trained is to be enabled.

The object is solved by a system with the features of claim 1. Advantageous embodiments are stated in the dependent claims.

In a system for identifying objects by means of distributed neural networks, the resource-intensive portion of the neural network is moved to a base station (on the ground), where no significant limitations regarding size, weight and power consumption are present, while, on the front end (e.g. remote-controlled vehicle), only the feature maps or the characterization are processed.

In one variant, a highly performant neural network can be provided at a base station (on the ground), while a less performant neural network can be provided on a front-end side, in particular, on a vehicle such as an aerial vehicle.

In this process, a high-resolution camera device can be provided on the front-end side to generate a high-resolution video. The front-end side neural network can be designed to identify and mark image areas "of interest" in the video. In this process, image areas are to be understood as image areas "of interest" which, depending on the task of the object identification mission, contain characteristic features, which possibly allow conclusions on objects to be identified, with, however, a final evaluation and characterization not yet being possible.

A video-processing means can be provided for selecting and defining ROIs (ROI—"region of interest") due to the previously identified image areas of interest and for encoding the ROIs into the video. The ROIs are, in this respect, a continuation of the areas previously characterized as image areas "of interest".

Furthermore, a data radio connection can be provided for transmitting the video from the video-processing means to the base station.

The base-station side neural network can be designed to evaluate the ROIs extracted from the video received and identify the objects present in the ROIs. The ROIs are extracted from the video received within the base station and made available to the neural network.

The base-station side neural network is designed significantly deeper than the front-end side neural network. Thus, the base-station side neural network can have virtually unlimited resources for analysis and identifying objects at its disposal. An AI (artificial intelligence) computer entrusted therewith finally re-compiles the entire video and, in particular, supplements the objects identified by the base-station side neural network. The video can contain the ROIs, with new bounding boxes, a classification for the objects identified and the symbols for further areas not encoded as ROIs.

A display means can be provided for displaying the objects identified by the base-station side neural network or the video created therewith.

An operating means can be provided for modifying parameters of the system, with at least one of the parameters being selected from the group of:
 position of the ROIs;
 size of the ROIs;
 evaluation of the ROIs;
 display of an ROI;
 defining a new ROI;
 deciding on a color or black-and-white display.

With the aid of the operating means, the operator on the ground can dynamically change the display.

In addition, a method for identifying objects is specified, comprising the steps of:
 providing a highly performant neural network at a base station;
 providing a less performant neural network on a front-end side;
 generating a high-resolution video on the front-end side;
 identifying image areas of interest in the video by the front-end side neural network and marking these image areas;
 selecting and defining ROIs (ROI—"region of interest") due to the previously identified image areas of interest and encoding the ROIs into the video;
 transmitting the video from the front-end side to the base station;
 extracting ROIs from the video received;
 evaluating the extracted ROIs and identifying objects present in the ROIs by the base-station side neural network.

The technical complexity of the front-end side and for the transmission of data between the base station and the front end can thus be reduced.

The proposed solution contributes to an enhancement of all systems which address object identification by means of video processing (e.g. for remote-controlled applications).

Such systems can, for example, be used for unmanned aerial vehicles (e.g. drones). One area of application could be the drone-based search for victims in natural disasters. The drone can then, with the aid of artificial intelligence in the form of neural networks distributed both to the drone itself and to the base station, search for and identify victims in need of help. In this way, a significant simplification and acceleration of the work of rescue services could be achieved.

The invention is explained based on an example, with the aid of the accompanying figures in which:

FIG. 3 shows a table with an overview of the portions of learning parameters in the feature mapping layers and the fully connected layers;

The suggested solution allows to move the resource-intensive portion of the neural network to a base station (on the ground), where no significant limitations regarding size, weight and power consumption are present.

Figure 1:
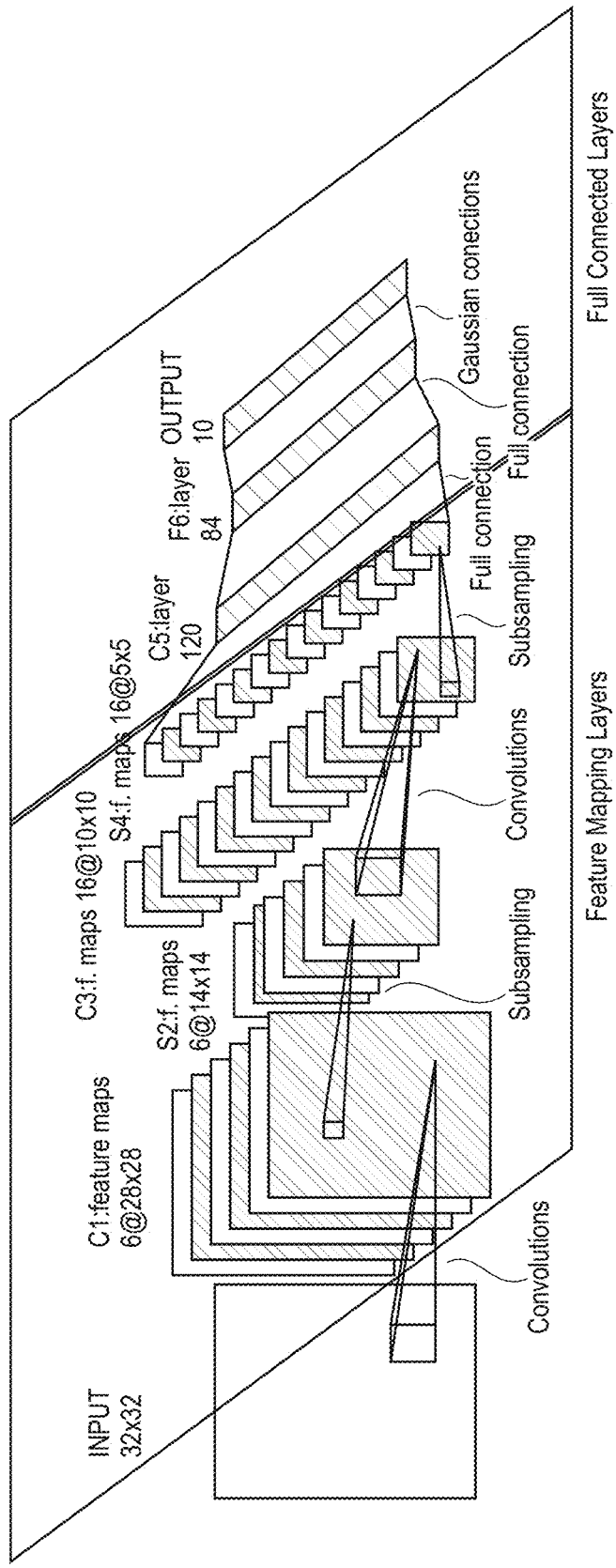
FIG. 1 shows, in a schematic representation, a system for identifying objects, with distribution to feature mapping layers and fully connected layers.
Figure 2:
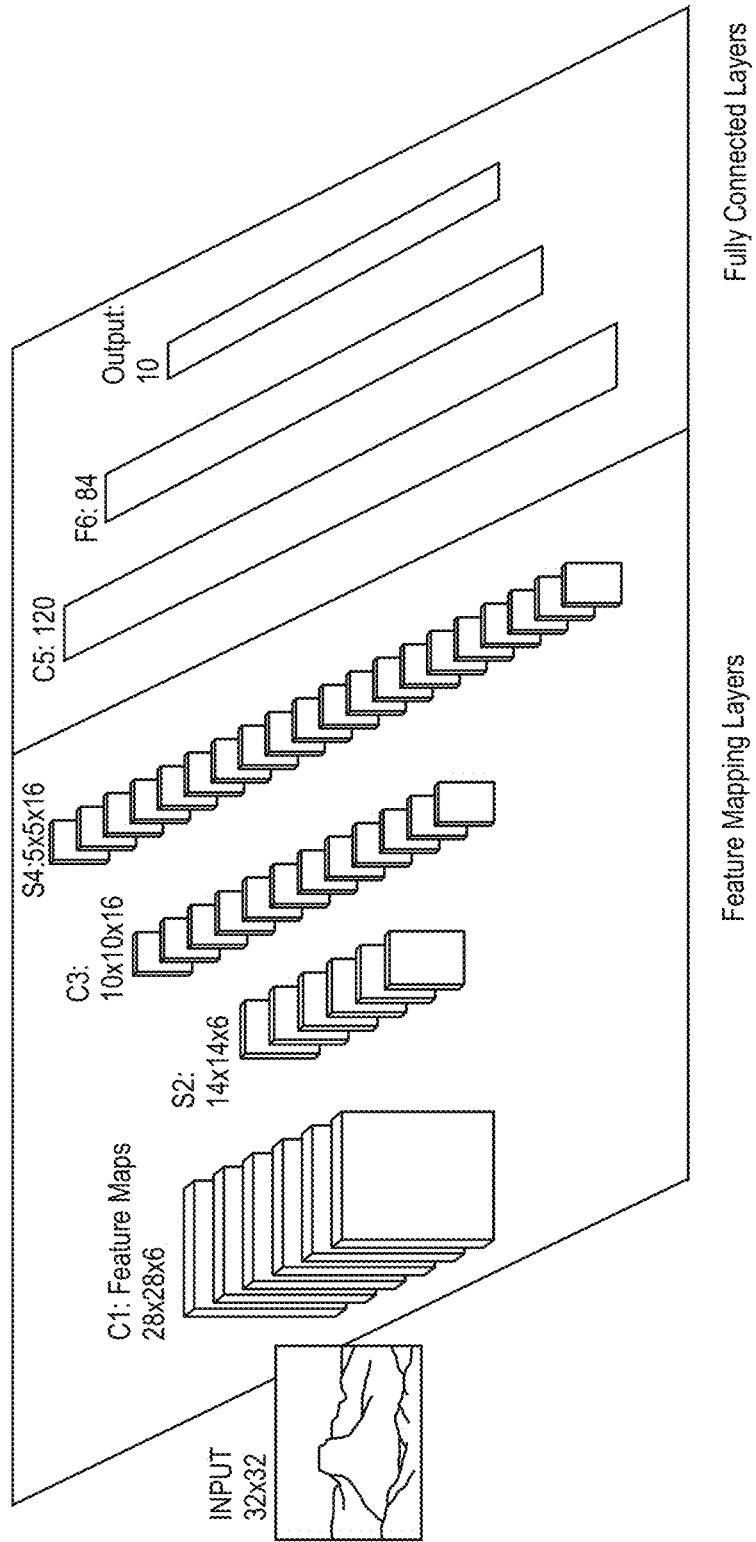
FIG. 2 shows the schematic diagram of FIG. 1 in another representation.

On the front end (e.g. remote-controlled vehicle), however, only the feature maps or the characterization are processed (see FIGS. 1 and 2).

As illustrated in the table of FIG. 3, the amount of learning parameters in the subsequent "fully connected" portion of the network grows tremendously, while the number of parameters in the feature mapping layers is very low (convolutional and pooling layers).

Parallel to this, the number of pixels/data is reduced to a minimum fraction of the original (video) image.

The information is serialized between the feature mapping layers and the "fully connected layers", i.e. height and width=1, and the depth corresponds to the maximum number of the fields/pixels from the previous level.

The solution provides that the division of the network into a portion remaining in the vehicle and a portion in the base station is performed at a site with a minimized number of "transfer parameters", e.g. between "convolutional layers" and "fully connected layers". The huge number of fully connected connections and the associated parameters can then be calculated by the computer of the base station, while the convolutional layers and the pooling layers are calculated with few learning parameters on the vehicle.

Instead of the transmission of a plurality of Mbytes/s for compressed video streams, which often, due to the fluctuating bandwidth of the data link, also do not supply a constant image quality, the described approach only requires transmissions in the range of Kbytes/s, even for identifying objects in high-resolution videos.

Figure 4:
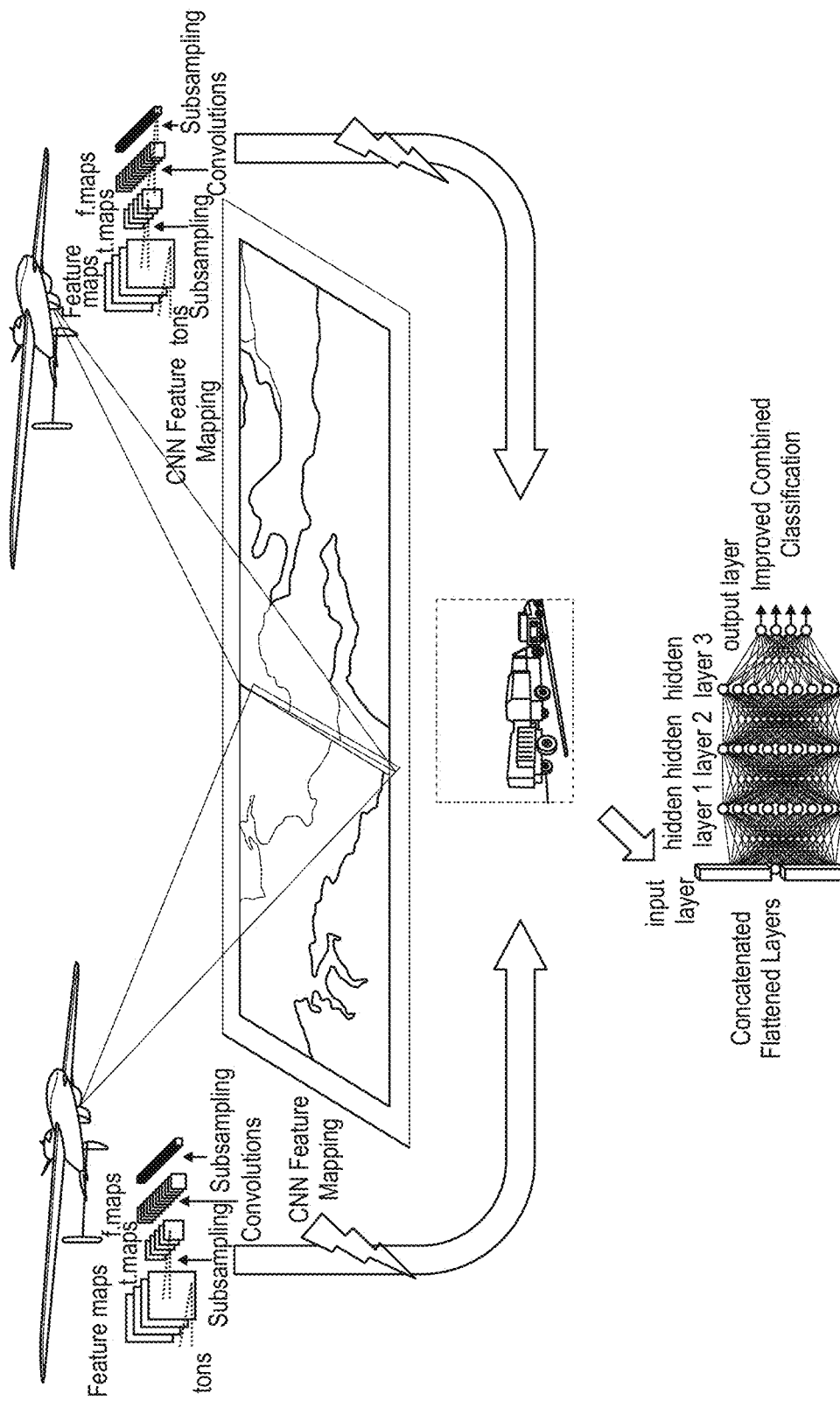
FIG. 4 shows the system for identifying objects in another representation.

The described method principle of identifying objects by means of division into two parts (e.g. base, vehicle) can be used to continuously enhance the quality of object identification (see FIG. 4) and enables the use of this technology in environments with restricted availability of computer resources.

Due to the use of a plurality of vehicles or additional stationary sensors, the feature characterizations of the various sources can be merged as a serialized representation at the base and processed via a common fully connected network. The synchronization of the image sources is presumed. This leads to a quality enhancement of the forecasts, especially also with regard to identifying objects.

Also, an implementation of a plurality of parallel networks is possible, which analyze the same objects from different perspectives or with a different network architecture, or which have been trained with a different set of training images, can—with a comparison of the results—give each other feedback for the output nodes and can thus automatically continue to learn.

Compared to well-known systems, the described solution can also be used on small and medium-sized remote-controlled or autonomous vehicles.

The system can also continue to learn after qualification of the vehicle, without having to modify the vehicle. The enhancements can be carried out at the base station (cf. also FIG. 5).

Figure 5:
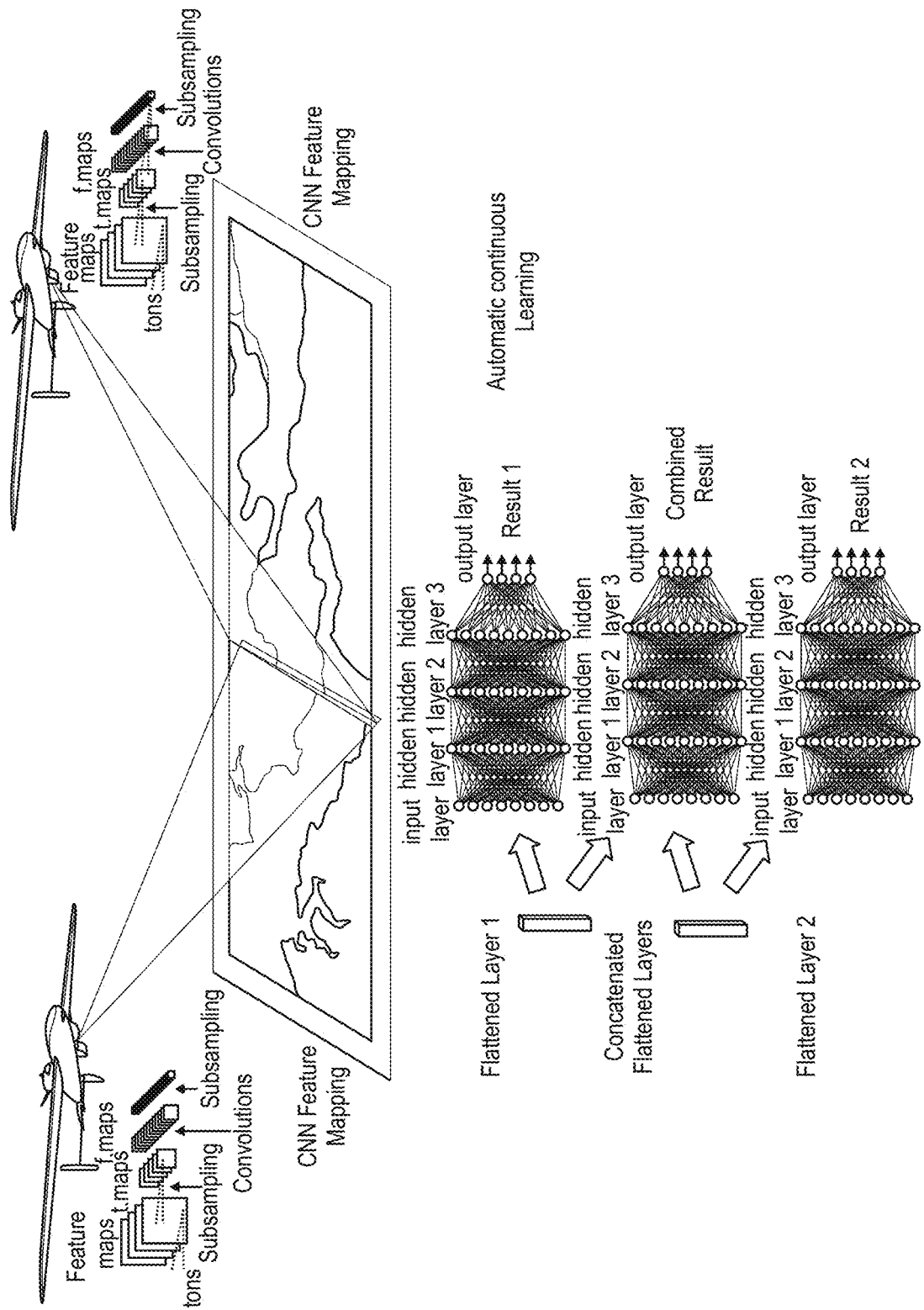
FIG. 5 shows the system for identifying objects in an additional representation.

Compared to well-known systems, the described solution could automatically analyze objects from different perspectives and enhance the results through common classification layers (see also FIG. 5).

Figure 6:
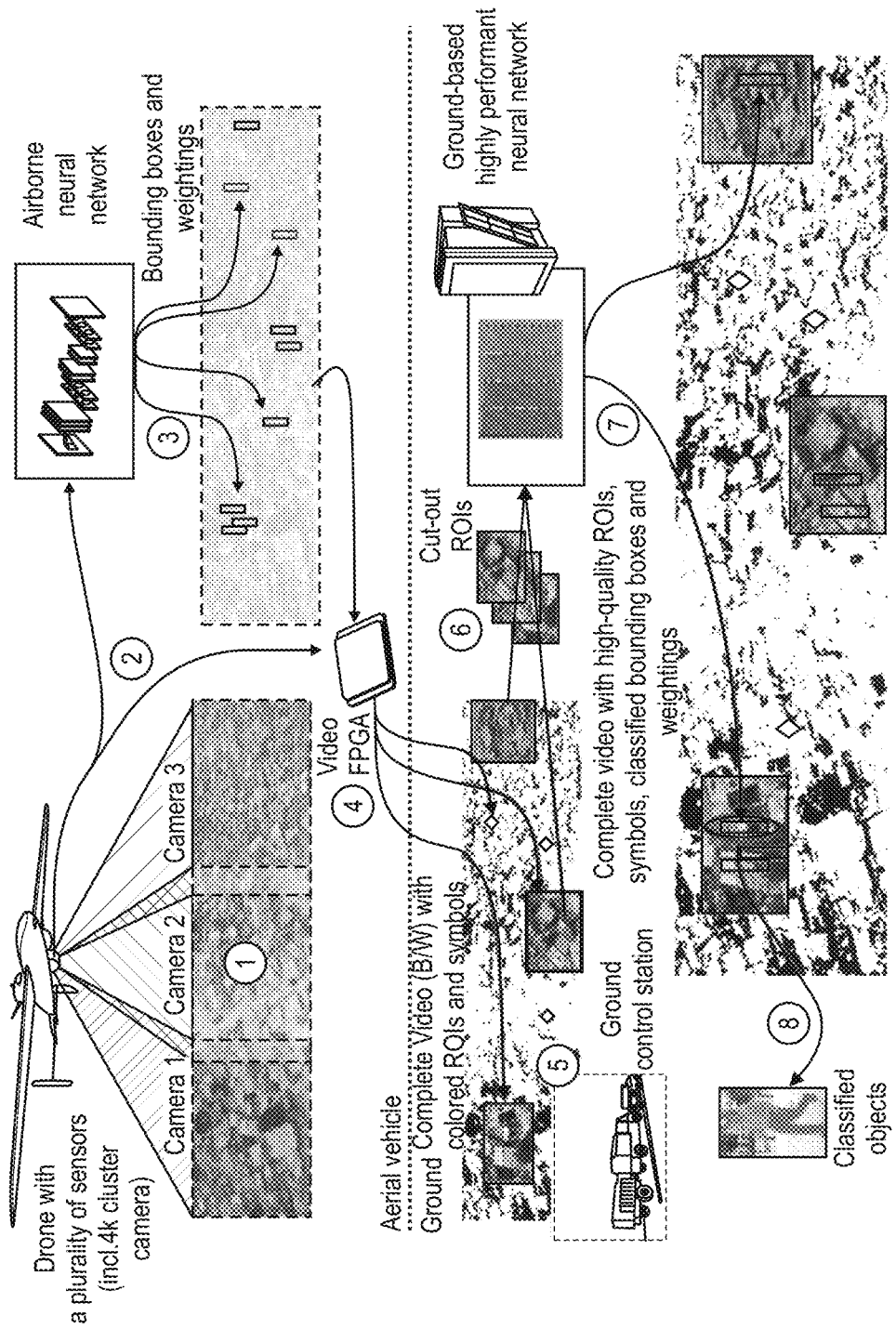
FIG. 6 shows a variant of the system for identifying objects.

FIG. 6 shows a variant in the form of a function and use principle. The subsequently numbered paragraphs refer to the position numbers (encircled digits) entered in FIG. 6.

(1) For the analysis of large-area scenarios, e.g. disaster areas after an earthquake, a drone is used by way of example and, in addition to the existing daylight and infrared sensors, equipped with a cluster camera. It consists of a plurality of individual cameras (cameras 1-3), which, in combination, guarantee a very broad perspective. In this way, it is possible to completely cover also larger areas or landscapes.

(2) The individual videos of the cluster camera are combined into a single video with 4k resolution (e.g. UHD video) (so-called "stitching") in a video-processing unit on board the drone. A normalized (scaled) version of this video is supplied to an embedded neural network for analysis and object identification, while the complete video with full resolution is passed on in parallel with a video-processing unit. Thus, the embedded neural network is front-end side, i.e. present in the aerial vehicle (e.g. the drone).

(3) The embedded neural network is capable of identifying image areas "of interest" or objects (e.g. alleged victims of a natural disaster, destroyed houses, etc.) and supplies, as an output, the coordinates of so-called "bounding boxes", which mark objects found and evaluate related weightings ("scores"), which evaluate the probability of the forecast.

Thus, the embedded neural network can already perform a certain preliminary evaluation of the computed video data and characterize image areas of presumed interest or objects with the aid of the existing artificial intelligence.

In this process, the processing performance of the embedded neural network is usually not sufficient to qualify image areas identified as "of interest" or the objects found therein with sufficient safety and accuracy.

(4) The coordinates and probabilities identified by the neural network are used by the video-processing unit to define so-called ROIs (ROI—"region of interest"). ROIs can have a larger surface as the previously defined bounding boxes and also can contain a plurality of these markings. If, for example, a plurality of densely packed objects "of interest" have been identified by the neural network, they can be summarized into a single ROI.

Based on the probability parameters, the most significant ROIs are directly encoded into the video, while less probable areas can be marked with a color code via symbols.

To further increase the compression rate, the areas outside the ROIs can be optionally transmitted in the black-andwhite format, as illustrated in FIG. 6. With a corresponding radio bandwidth, the transmission can naturally be completely in color.

(5) The encoded video is transmitted with symbol coordinates and ROIs to the ground control station via the data radio connection of the drone and decoded there again. The video thus has areas with a high resolution (with the ROIs) and, depending on the bandwidth of the connection between the drone and the ground station, low resolution (if need be, in black and white only).

(6) For a detailed analysis of the ROIs, they are automatically cut out from the video and supplied to a ground-based neural network. This network operates on a dedicated AI computer with a highly performant processor and a plurality of GPUs.

Processing on the ground is ultimately enabled by the mechanism of the ROIs, which supply high-quality video material for these areas which is stable despite a fluctuating radio bandwidth.

(7) The AI computer stationed on the ground uses a significantly deeper neural network as the airborne component on the airplane and offers virtually unlimited resources for analysis and object identification.

The AI computer finally displays the complete video on the display unit on the ground. It contains the ROIs with new bounding boxes, a classification (8) for the objects identified and the symbols for further areas not encoded as ROIs.

The operator on the ground can dynamically change the display. They can, for example, dynamically move the ROIs displayed, and/or
change the size of the ROIs,
select symbols and have them displayed as ROIs (the ROI with the lowest score will then disappear and become a symbol),
define an ROI themselves,
select a colored or black-and-white display.

The invention claimed is:

1. A system for identifying objects using distributed neural networks, the system comprising:
a highly performant neural network provided at a base station;
a less performant neural network provided on a front-end side, the less performant neural network having a lower depth and a lower performance capacity than the highly performant neural network;
a high-resolution camera device provided on the front-end side and configured to generate a high-resolution video, wherein the front-end side neural network is designed to identify and mark image areas of interest in the video, wherein the image areas of interest are image areas which contain characteristic features which allow conclusions on objects to be identified within the scope of an object identification mission, wherein a final evaluation and characterization is not possible due to the lower performance capacity of the front-end side neural network;
a video-processing unit configured to select and define ROIs (ROI—"region of interest") due to the previously identified image areas of interest and to encode the ROIs into the video; and
a data radio connection configured to transmit the video from the video-processing unit to the base station,
wherein the base-station side neural network is designed to evaluate the ROIs extracted from the video received and identify objects present in the ROIs.

2. The system of claim 1, further comprising a display unit configured to display the objects identified by the base-station side neural network.

3. The system of claim 1, further comprising:
an operating means for changing parameters of the system,
wherein at least one of the parameters is selected from the group consisting of:
position of the ROIs;
size of the ROIs;
evaluation of the ROIs;
display of an ROI;
defining a new ROI; and
deciding on a color or black-and-white display.

4. A method for identifying objects, the method comprising:
providing a highly performant neural network at a base station;
providing a less performant neural network on a front-end side, the less performant neural network having a lower depth and a lower performance capacity than the highly performant neural network;
generating a high-resolution video on the front-end side;
identifying image areas of interest in the video by the front-end side neural network and marking the image areas of interest, wherein the image areas of interest are image areas which contain characteristic features which allow conclusions on objects to be identified within the scope of an object identification mission, wherein a final evaluation and characterization is not possible due to the lower performance capacity of the front-end side neural network;
selecting and defining ROIs (ROI—"region of interest") due to the previously identified image areas of interest and encoding the ROIs into the video;
transmitting the video from the front-end side to the base station;
extracting the ROIs from the video received; and
evaluating the extracted ROIs and identifying objects present in the ROIs by the base-station side neural network.

5. The method of claim 4, further comprising:
changing parameters of the system,
wherein at least one of the parameters is selected from the group consisting of:
position of the ROIs;
size of the ROIs;
evaluation of the ROIs;
display of an ROI;
defining a new ROI; and
deciding on a color or black-and-white display.

* * * * *